United States Patent
Okazaki (10) Patent No.: US 9,353,015 B2
(45) Date of Patent: May 31, 2016

(54) CERAMIC HONEYCOMB STRUCTURE AND ITS PRODUCTION METHOD

(71) Applicant: HITACHI METALS, LTD., Tokyo (JP)

(72) Inventor: Shunji Okazaki, Miyako-gun (JP)

(73) Assignee: HITACHI METALS, LTD., Tokyo (JP)

( * ) Notice: Subject to any disclaimer, the term of this patent is extended or adjusted under 35 U.S.C. 154(b) by 50 days.

(21) Appl. No.: 14/106,955

(22) Filed: Dec. 16, 2013

(65) Prior Publication Data
US 2014/0103560 A1    Apr. 17, 2014

Related U.S. Application Data

(62) Division of application No. 13/580,344, filed as application No. PCT/JP2011/053567 on Feb. 18, 2011, now Pat. No. 8,636,821.

(30) Foreign Application Priority Data

Feb. 22, 2010    (JP) ................. 2010-035527

(51) Int. Cl.
*B01D 39/14* (2006.01)
*B01D 39/20* (2006.01)
(Continued)

(52) U.S. Cl.
CPC ........... *C04B 38/0006* (2013.01); *C04B 35/195* (2013.01); *C04B 35/478* (2013.01); *C04B 41/009* (2013.01); *C04B 41/5089* (2013.01);
(Continued)

(58) Field of Classification Search
CPC .............. C04B 38/006; C04B 38/0054; Y10T 428/24149; B01D 46/2429; B01D 2046/2437
See application file for complete search history.

(56) References Cited

U.S. PATENT DOCUMENTS 5,458,664 A * 10/1995 Ishii et al. ................. 55/282
6,077,483 A *  6/2000 Locker et al. ............ 422/179
(Continued)

FOREIGN PATENT DOCUMENTS

EP    1493904 A1    1/2005
EP    2554237 A1    2/2013
(Continued)

OTHER PUBLICATIONS

Communication dated Apr. 24, 2015, issued by the European Patent Office in corresponding European Application No. 11744773.0.

*Primary Examiner* — Amber R Orlando
(74) *Attorney, Agent, or Firm* — Sughrue Mion, PLLC (57) ABSTRACT

A ceramic honeycomb structure having a large number of flow paths partitioned by porous cell walls, the cell walls meeting the conditions; (a) the cell walls having porosity of 55-80%, (b) the cell walls having a median pore diameter D50 (measured by mercury porosimetry) of 5-27 μm, (c) pores open on cell wall surfaces having an opening area ratio of 20% or more, (d) pores open on cell wall surfaces having a median opening diameter d50 (determined from equivalent circle diameters on an area basis) of 10-45 μm, (e) the density of pores open on cell wall surfaces having equivalent circle diameters of 10 μm or more and less than 40 μm being 350/mm$^2$ or more, (f) the maximum inclination of a curve of a cumulative pore volume relative to a pore diameter (determined from a pore distribution measured by mercury porosimetry) being 1.6 or more, and (g) a ratio D50/d50 of the median pore diameter D50 to the median opening diameter d50 being 0.65 or less.

9 Claims, 4 Drawing Sheets

(51) Int. Cl.
  *B01D 39/06* (2006.01)
  *B01D 24/00* (2006.01)
  *C04B 38/00* (2006.01)
  *F01N 3/022* (2006.01)
  *C04B 35/195* (2006.01)
  *C04B 35/478* (2006.01)
  *C04B 41/85* (2006.01)
  *C04B 41/00* (2006.01)
  *C04B 41/50* (2006.01)
  *B01D 46/24* (2006.01)
  *C04B 111/00* (2006.01)

(52) U.S. Cl.
  CPC ............. *C04B 41/85* (2013.01); *F01N 3/0222* (2013.01); *B01D 46/2429* (2013.01); *B01D 46/2444* (2013.01); *B01D 2046/2433* (2013.01); *B01D 2046/2437* (2013.01); *B01D 2239/125* (2013.01); *B01D 2239/1216* (2013.01); *B01D 2279/30* (2013.01); *C04B 2111/00793* (2013.01); *C04B 2235/3206* (2013.01); *C04B 2235/3217* (2013.01); *C04B 2235/3218* (2013.01); *C04B 2235/3232* (2013.01); *C04B 2235/349* (2013.01); *C04B 2235/3418* (2013.01); *C04B 2235/5296* (2013.01); *C04B 2235/5436* (2013.01); *C04B 2235/5445* (2013.01); *C04B 2235/6021* (2013.01); *C04B 2235/6562* (2013.01); *C04B 2235/6565* (2013.01); *C04B 2235/6567* (2013.01); *C04B 2235/9607* (2013.01); *F01N 2330/06* (2013.01); *Y02T 10/20* (2013.01)

(56) References Cited

U.S. PATENT DOCUMENTS

| | | | |
|---|---|---|---|
| 6,620,751 B1 | 9/2003 | Ogunwumi | |
| 6,814,774 B2 | 11/2004 | Ishihara et al. | |
| 6,967,006 B1 * | 11/2005 | Wirth et al. | 422/179 |
| 7,648,547 B2 | 1/2010 | Ohno | |
| 7,785,385 B2 | 8/2010 | Kawata et al. | |
| 8,178,185 B2 * | 5/2012 | Sakaguchi et al. | 428/116 |
| 8,388,721 B2 | 3/2013 | Ishizawa | |
| 8,821,609 B2 | 9/2014 | Okazaki et al. | |
| 2002/0198104 A1 | 12/2002 | Nishimura et al. | |
| 2003/0041574 A1 | 3/2003 | Noguchi et al. | |
| 2003/0093982 A1 | 5/2003 | Suwabe et al. | |
| 2003/0166450 A1 | 9/2003 | Kumazawa et al. | |
| 2003/0230060 A1 * | 12/2003 | Yahata et al. | 55/282.3 |
| 2004/0029707 A1 | 2/2004 | Beall et al. | |
| 2004/0216614 A1 * | 11/2004 | Schulte et al. | 96/417 |
| 2005/0011174 A1 * | 1/2005 | Hong et al. | 55/523 |
| 2005/0161849 A1 | 7/2005 | Ohno et al. | |
| 2005/0163675 A1 | 7/2005 | Nishimura et al. | |
| 2005/0175514 A1 | 8/2005 | Ohno | |
| 2006/0107649 A1 * | 5/2006 | Kamikawa et al. | 60/274 |
| 2006/0154021 A1 | 7/2006 | Ohno et al. | |
| 2006/0228521 A1 | 10/2006 | Ohno et al. | |
| 2006/0254231 A1 * | 11/2006 | Hayashi et al. | 55/523 |
| 2007/0006561 A1 | 1/2007 | Brady et al. | |
| 2007/0039297 A1 | 2/2007 | Kawata et al. | |
| 2007/0116908 A1 | 5/2007 | Ohno et al. | |
| 2007/0254798 A1 | 11/2007 | Addiego et al. | |
| 2007/0293392 A1 | 12/2007 | Ohno et al. | |
| 2009/0022633 A1 * | 1/2009 | Tomosue et al. | 422/177 |
| 2009/0176043 A1 | 7/2009 | Tomita et al. | |
| 2009/0226347 A1 | 9/2009 | Bardon et al. | |
| 2010/0209308 A1 * | 8/2010 | Kunze et al. | 422/179 |
| 2011/0262691 A1 * | 10/2011 | Naruse et al. | 428/116 |
| 2013/0019579 A1 | 1/2013 | Okazaki et al. | |
| 2014/0333000 A1 | 11/2014 | Okazaki et al. | |

FOREIGN PATENT DOCUMENTS

| | | | |
|---|---|---|---|
| JP | 61-129015 | A | 6/1986 |
| JP | 2002-219319 | A | 8/2002 |
| JP | 2002-349234 | A | 12/2002 |
| JP | 2002-355511 | A | 12/2002 |
| JP | 2003-0404687 | A | 2/2003 |
| JP | 2003-193820 | A | 7/2003 |
| JP | 2004-360654 | A | 12/2004 |
| JP | 2005-095884 | A | 4/2005 |
| JP | 2005-177626 | A | 7/2005 |
| JP | 2005-519834 | A | 7/2005 |
| JP | 2005-530616 | A | 10/2005 |
| JP | 2007-290951 | A | 11/2007 |
| JP | 2009-149500 | A | 7/2009 |
| JP | 2009-532195 | A | 9/2009 |
| WO | 2005/068397 | A1 | 7/2005 |

* cited by examiner

CERAMIC HONEYCOMB STRUCTURE AND ITS PRODUCTION METHOD

CROSS REFERENCE TO RELATED APPLICATIONS

This is a Divisional application of U.S. application Ser. No. 13/580,344 filed Aug. 21, 2012 which is a National Stage of International Application No. PCT/JP2011/053567 filed on Feb. 18, 2011, which claims priority from Japanese Patent Application No. 2010-035527, filed on Feb. 22, 2010, the contents of all of which are incorporated herein by reference in their entirety.

FIELD OF THE INVENTION

The present invention relates to a ceramic honeycomb structure for constituting a ceramic honeycomb filter for removing particulate matter from exhaust gases discharged from diesel engines.

BACKGROUND OF THE INVENTION

An exhaust gas discharged from diesel engines contains particulate matter (PM) comprising as main components carbonaceous soot and soluble organic fractions (SOFs) comprising high-boiling-point hydrocarbon components, which are likely to adversely affect humans and environment when discharged into the air. Accordingly, ceramic honeycomb filters have conventionally been attached to exhaust pipes of diesel engines for removing PM.

Figure 1:
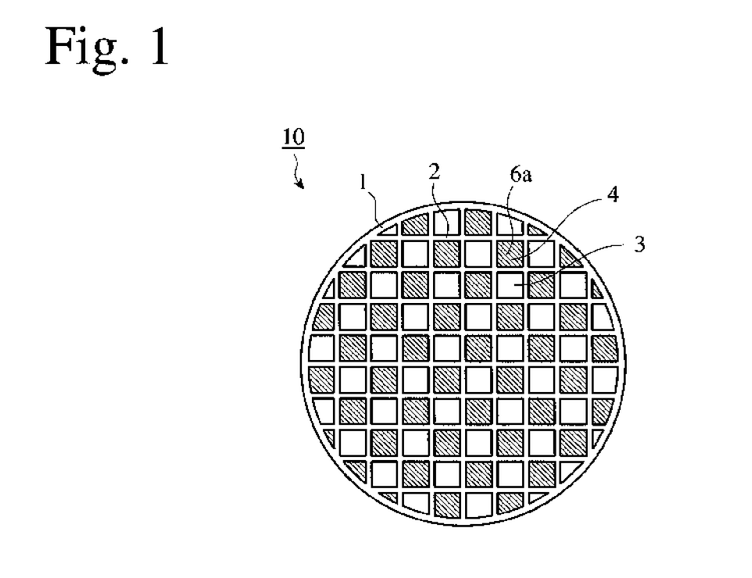
FIG. 1 is a front view showing one example of ceramic honeycomb filters.
Figure 2:
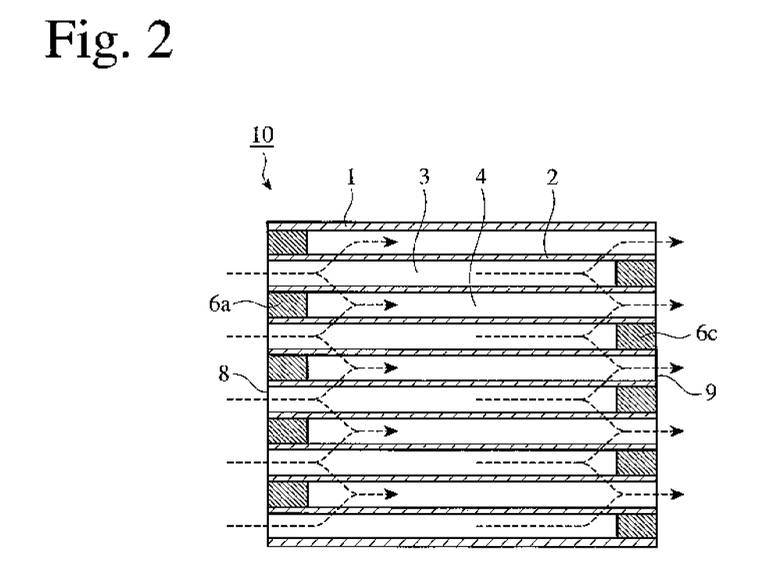
FIG. 2 is a schematic cross-sectional view showing one example of ceramic honeycomb filters.

One example of ceramic honeycomb filters for capturing PM in the exhaust gas is shown in FIGS. 1 and 2. A ceramic honeycomb filter 10 comprises a ceramic honeycomb structure comprising porous cell walls 2 defining a large number of outlet-side-sealed flow paths 3 and inlet-side-sealed flow paths 4 and a peripheral wall 1, and upstream-side plugs 6a and downstream-side plugs 6c sealing the exhaust-gas-inlet-side end surface 8 and exhaust-gas-outlet-side end surface 9 of the flow paths 3 and 4 alternately in a checkerboard pattern. The peripheral wall 1 of the ceramic honeycomb filter is fixed by grip members (not shown) of metal meshes or ceramic mats, etc. to prevent movement during operation, and disposed in a metal container (not shown).

In the ceramic honeycomb filter 10, an exhaust gas is cleaned as follows. As shown by dotted arrows in FIG. 2, an exhaust gas flows into the outlet-side-sealed flow paths 3 opening on the inlet-side end surface 8. While passing through the cell walls 2, particularly through communicating pores on and in the cell walls 2, PM in the exhaust gas is captured. The cleaned exhaust gas flows from the inlet-side-sealed flow paths 4 opening on the exhaust-gas-outlet-side end surface 9 to the air.

PM continuously captured by the cell walls 2 clogs communicating pores on and in the cell walls 2, resulting in increased pressure loss when the exhaust gas passes through the ceramic honeycomb filter. Accordingly, PM should be burned off to regenerate the ceramic honeycomb filter before the pressure loss reaches a predetermined level. The ceramic honeycomb filter should meet the requirements of a high capturing ratio of particulate and low pressure loss. However, because these requirements are in a contradictory relation, the optimization of porosity, pore volume, the size of pores on the cell wall surface, etc. have conventionally been investigated to meet both requirements.

To cope with increasingly stricter recent exhaust gas regulations, investigation has been conducted on exhaust-gas-cleaning apparatuses comprising both of a NOx-removing SCR apparatus and a particulate-removing honeycomb filter, and the honeycomb filter is required to have better pressure loss characteristics than those of conventional ones.

PM includes a large number of so-called nano-particles having diameters of 50 nm or less. When inhaled, these nano-particles are more attached to respiratory organs than larger particles in the same weight. Also, because nano-particles have larger surface areas per volume, toxic chemical substances adsorbed onto their surfaces likely make PM particles more toxic. Because the amount of nano-particles in PM is small in terms of weight, current PM weight regulations do not work well. Future exhaust gas regulations are thus expected to require the reduction of the number of nano-particles dominant in terms of number in particles discharged. Accordingly, honeycomb filters are required to have improved PM-capturing ratios not on a current PM weight basis, but on a basis of the number of PM particles, particularly nano-particles, in addition to excellent pressure loss characteristics.

JP 2005-530616 A discloses a ceramic filter constituted by a cordierite honeycomb structure with ends plugged for capturing and burning particulate discharged from diesel engines, d50/(d50+d90) determined from a pore diameter distribution being less than 0.70, a permeability factor Sf when soot is accumulated, which is defined by the formula of [d50/(d50+d90)]/[porosity (%)/100], being less than 1.55, and a thermal expansion coefficient (25° C. to 800° C.) being $17 \times 10^{-7}$/° C. or less. JP 2005-530616 A describes that with such a pore structure (pore size distribution and the communications of pores), small pressure loss can be kept even when carbon soot is accumulated.

JP 2002-219319 A discloses a porous honeycomb filter formed by a material whose main crystal phase is cordierite having a controlled pore size distribution, the pore size distribution being such that the volume of pores having diameters of less than 10 μm is 15% or less of the total pore volume, the volume of pores having diameters of 10-50 μm is 75% or more of the total pore volume, and the volume of pores having diameters exceeding 50 μm is 10% or less of the total pore volume. JP 2002-219319 A describes that because of the above pore size distribution, this porous honeycomb filter has high efficiency of capturing PM, etc., with suppressed pressure loss increase due to the clogging of pores. JP 2002-219319 A also describes that such pore size distribution can be controlled by adjusting the particle size of a silica component, one of cordierite-forming materials, and by lowering the concentration of kaolin.

JP 61-129015 A discloses an exhaust-gas-cleaning filter having small pores having diameters of 5-40 μm and large pores having diameters of 40-100 μm on at least inlet path surfaces of cell walls, the number of small pores being 5-40 times that of large pores, pores on the surface communicating with pores inside the cell walls. JP 61-129015 A describes that this exhaust-gas-cleaning filter always exhibits high, substantially constant efficiency of capturing particulate.

JP 2003-40687 A discloses a ceramic honeycomb structure composed of cordierite as a main component, and having porosity of 55-65% and an average pore diameter of 15-30 μm, the total area of pores opening on the cell wall surface being 35% or more of the total cell wall surface area. JP 2003-40687 A describes that this honeycomb ceramic structure exhibits high capturing efficiency with low pressure loss.

JP 2002-355511 A discloses an exhaust-gas-cleaning filter comprising a ceramic honeycomb structure having a catalyst carried on the cell wall surface, the cell walls having porosity of 55-80%, and the total area of pores opening on the cell wall surface being 20% or more of the total cell wall surface area. JP 2002-355511 A describes that with increased contact area between the catalyst carried on the cell walls and the accumulated PM, this exhaust-gas-cleaning filter exhibits high performance of oxidizing PM by the catalyst with suppressed pressure loss increase.

JP 2002-349234 A discloses an exhaust-gas-cleaning filter having a catalyst carried, the total area of pores opening on the cell wall surface being 30% or more of the total cell wall surface area, the total opening area of large pores having opening diameters of 30 μm or more being 50% or more of the total opening pore area. JP 2002-349234 A describes that such structure provides drastically improved burning efficiency of PM, while preventing damage due to thermal stress.

JP 2003-193820 A discloses a ceramic honeycomb filter having porosity of 60% or more and an average pore diameter of 15 μm or more, the maximum value of an inclination $S_n$ of a curve of a cumulative pore volume relative to a pore diameter on cell walls at the n-th measurement point being 0.7 or more, $S_n$ being expressed by the formula of $S_n=-(V_n-V_{n-1})/(\log D_n-\log D_{n-1})$, wherein $D_n$ is a pore diameter (μm) at the n-th measurement point, $\log D_{n-1}$ is a pore diameter (μm) at the (n–1)-th measurement point, $V_n$ is a cumulative pore volume (cm$^3$/g) at the n-th measurement point, and $V_{n-1}$ is a cumulative pore volume (cm$^3$/g) at the (n–1)-th measurement point. JP 2003-193820 A describes that this ceramic honeycomb filter has high resistance to heat stress and heat shock stress, despite high porosity and a large average pore diameter described above.

However, the exhaust-gas-cleaning filters described in JP 2005-530616 A, JP 2002-219319 A, JP 61-129015 A, JP 2003-40687 A, JP 2002-355511 A, JP 2002-349234 A, and JP 2003-193820 A have PM-capturing performance, which increases as PM is accumulated to some extent, but is not necessarily sufficient in an initial use stage before PM is accumulated (when a ceramic honeycomb filter is used from an unused state, or reused after regeneration). Particularly they are insufficient in the efficiency of capturing nano-sized PM, which is important under increasingly stricter exhaust gas regulations. Insufficient capturing efficiency permits harmful nano-sized PM to flow out without captured.

JP 2004-360654 A discloses a ceramic honeycomb filter whose cell walls have porosity of 55-75% and an average pore diameter of 15-40 μm, the total area of pores opening on the cell wall surface being 10-30% of the total cell wall surface area, and pores having equivalent circle diameters of 5-20 μm being 300/mm$^2$ or more among those opening on the cell wall surface. The ceramic honeycomb filter described in JP 2004-360654 A has a PM-capturing ratio improved to some extent in terms of weight, but it is difficult to effectively capture nano-particles in an initial use stage before PM is accumulated. Namely, it has low PM-capturing efficiency in terms of particle number, with low possibility of meeting regulations in terms of number.

OBJECT OF THE INVENTION

Accordingly, an object of the present invention is to solve the problems of the above conventional technologies, providing a ceramic honeycomb structure effectively capturing nano-particles dominant in terms of number in particles discharged, even in an initial stage of the use of a ceramic honeycomb filter in which PM is not accumulated, when the ceramic honeycomb filter starts to be used from an unused state or reused after regeneration, thereby having an improved PM-capturing ratio in terms of particle number, while reducing the deterioration of pressure loss characteristics when PM is captured, and its production method.

DISCLOSURE OF THE INVENTION

Thus, the ceramic honeycomb structure of the present invention has a large number of flow paths partitioned by porous cell walls, the cell walls meeting the following conditions:

(a) the cell walls having porosity of 55-80%,
(b) the cell walls having a median pore diameter D50 (measured by mercury porosimetry) of 5-27 μm,
(c) pores open on cell wall surfaces having an opening area ratio of 20% or more,
(d) pores open on cell wall surfaces having a median opening diameter d50 (determined from equivalent circle diameters on an area basis) of 10-45 μm,
(e) the density of pores open on cell wall surfaces having equivalent circle diameters of 10 μm or more and less than 40 μm being 350/mm$^2$ or more,
(f) the maximum inclination of a curve of a cumulative pore volume relative to a pore diameter (determined from a pore distribution measured by mercury porosimetry) being 1.6 or more, and
(g) a ratio D50/d50 of the median pore diameter D50 to the median opening diameter d50 being 0.65 or less.

The cell walls preferably have a Darcy's coefficient of permeability of $0.5 \times 10^{-12}$ m$^2$ to $3 \times 10^{-12}$ m$^2$.

The ceramic honeycomb structure preferably has a thermal expansion coefficient of $13 \times 10^{-7}$/° C. or less between 20° C. and 800° C.

The ceramic honeycomb filter of the present invention comprises the ceramic honeycomb structure, whose flow paths are alternately plugged on the exhaust-gas-inlet or exhaust-gas-outlet side.

The method of the present invention for producing a ceramic honeycomb structure comprises the steps of extrusion-molding a moldable material containing a ceramic material and a pore-forming material to obtain a predetermined molding, and drying and sintering the molding; the moldable material containing 2-20% by mass of the pore-forming material based on 100% by mass of the ceramic material; the pore-forming material having a median diameter of 5-70 μm; and the pore-forming material being solid or hollow resin particles having inorganic powder on the surface.

The inorganic powder is preferably at least one selected from the group consisting of kaolin, silica, talc, cordierite, alumina, aluminum hydroxide, calcium carbonate and titanium oxide.

The inorganic powder preferably has a median diameter of 0.5-15 μm.

It is preferable that the ceramic material is a cordierite-forming material, that the cordierite-forming material contains 15-25% of silica, and that the silica has a median diameter of 20-30 μm and sphericity of 0.5 or more.

The cordierite-forming material preferably contains talc having a median diameter of 1-10 μm.

DESCRIPTION OF THE PREFERRED EMBODIMENTS

[1] Ceramic Honeycomb Structure

The ceramic honeycomb structure of the present invention has a large number of flow paths partitioned by porous cell walls, the cell walls meeting the conditions; (a) the cell walls having porosity of 55-80%, (b) the cell walls having a median pore diameter D50 (measured by mercury porosimetry) of 5-27 μm, (c) pores open on cell wall surfaces having an opening area ratio of 20% or more, (d) pores open on cell wall surfaces having a median opening diameter d50 (determined from equivalent circle diameters on an area basis) of 10-45 μm, (e) the density of pores open on cell wall surfaces having equivalent circle diameters of 10 μm or more and less than 40 μm being 350/mm² or more, (f) the maximum inclination of a curve of a cumulative pore volume relative to a pore diameter (determined from a pore distribution measured by mercury porosimetry) being 1.6 or more, and (g) a ratio D50/d50 of the median pore diameter D50 to the median opening diameter d50 being 0.65 or less.

The ceramic honeycomb structure having such constitution can effectively capture fine PM particles dominant in terms of particle number discharged, even in an initial use stage before PM is accumulated, when the ceramic honeycomb filter starts to be used from an unused state or reused after regeneration, resulting in an improved PM-capturing ratio in terms of particle number, and reduced deterioration of pressure loss characteristics when PM is captured.

(a) Porosity of Cell Walls

The cell walls have porosity of 55-80%. The porosity of less than 55% makes it difficult to keep low pressure loss when PM is captured and accumulated, and the porosity exceeding 80% reduces the PM-capturing ratio in terms of particle number in an initial use stage. The porosity is preferably 57%-75%, more preferably 57%-70%, most preferably 57%-65%. The porosity of cell walls is measured by mercury porosimetry as described below.

(b) Median Diameter of Cell Wall Pores Measured by Mercury Porosimetry

The pores of cell walls have a median diameter (median pore diameter D50) of 5-27 μm when measured by mercury porosimetry. The median pore diameter D50 of less than 5 μm makes it difficult to keep initial pressure loss low at the start of use. On the other hand, the median pore diameter D50 of more than 27 μm results in the reduction of pores having diameters of 5-27 μm effective for capturing PM, likely reducing the PM-capturing ratio in terms of their number. The median pore diameter D50 is preferably 7-25 μm, more preferably 7-20 μm, most preferably 7-18 μm. The median pore diameter D50 is a median diameter determined from the pore distribution of cell walls measured by mercury porosimetry.

(c) Opening Area Ratio of Pores Open on Cell Wall Surfaces

Pores open on cell wall surfaces have an opening area ratio of 20% or more. The opening area ratio is the total area of pores open per a unit area of the cell wall surface, which is obtained by measuring the total area of pore openings on an electron photomicrograph of a cell wall surface by an image analyzer (for instance, Image-Pro Plus Ver. 3.0 available from Media Cybernetics), and dividing it by the area of a field measured.

When the opening area ratio is less than 20%, it is difficult to keep low pressure loss when PM is captured and accumulated. To prevent the reduction of a PM-capturing ratio in terms of particle number in an initial use stage, the opening area ratio is preferably 40% or less, more preferably 23-38%.

Figure 3:
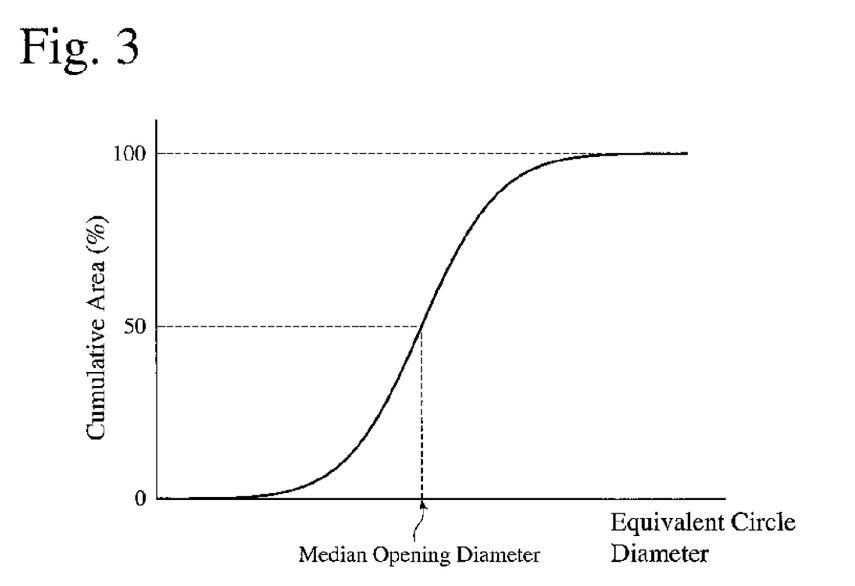
FIG. 3 is a graph schematically showing the relation between equivalent circle diameters of pores open on cell wall surfaces of a ceramic honeycomb structure and a cumulative area.

(d) Median Diameter of Pores Open on Cell Wall Surface Determined from Equivalent Circle Diameters on an Area Basis The median diameter (median opening diameter d50) of pores open on cell wall surfaces expressed by an equivalent circle diameter on an area basis is 10-45 μm. The median opening diameter d50 is an equivalent circle diameter of a pore at a cumulative area corresponding to 50% of the total pore area, in a graph of a cumulative area of pores open on cell wall surfaces (cumulative opening area of pores having diameters equal to or less than a particular equivalent circle diameter) plotted against an equivalent circle diameter of an open pore (diameter of a circle having an area equal to the opening area of a pore) as shown in FIG. 3. The opening areas and equivalent circle diameters of pores are determined by analyzing an electron photomicrograph of a cell wall surface by an image analyzer (for instance, Image-Pro Plus Ver. 6.3 available from Media Cybernetics).

When the median opening diameter d50 is less than 10 μm, low pressure loss cannot be kept when PM is captured and accumulated. When the median opening diameter d50 is more than 45 μm, there is a low PM-capturing ratio in terms of particle number in an initial use stage. The median opening diameter d50 is preferably 15-40 μm, more preferably 15-35 μm.

(e) Density of Pores Open on Cell Wall Surfaces Having Equivalent Circle Diameters of 10 μm or More and Less Than 40 μm.

The density of pores open on cell wall surfaces having equivalent circle diameters of 10 μm or more and less than 40 μm is 350/mm² or more. The density of pores open on cell wall surfaces having equivalent circle diameters of 10 μm or more and less than 40 μm is the number of pores having equivalent circle diameters of 10 μm or more and less than 40 μm per a unit area of the cell wall surface.

The pore density of less than 350/mm² provides a low PM-capturing ratio in terms of particle number in an initial use stage, and fails to increase the PM-capturing ratio when PM is accumulated. The pore density is preferably 400/mm² or more. The pore density is preferably 900/mm² or less.

(f) Maximum Inclination of Cumulative Pore Volume Curve of Cell Walls

When a cumulative pore volume and a pore diameter are determined from a pore distribution of cell walls measured by mercury porosimetry, the maximum inclination of a curve of the cumulative pore volume relative to the pore diameter (logarithmic value), which is called a cumulative pore volume curve, is 1.6 or more. The cumulative pore volume curve is obtained by plotting a cumulative pore volume (cm³/g) against the logarithmic value of a pore diameter (μm). The maximum inclination of less than 1.6 provides poor pressure loss characteristics when PM is captured and accumulated. The maximum inclination is preferably 1.8 or more. The maximum $S_n$ of 1.6 or more provides an extremely sharp pore diameter distribution, improving a PM-capturing ratio in terms of particle number in an initial use stage, and providing a ceramic honeycomb structure with improved pressure loss characteristics when PM is captured and accumulated.

The inclination can be determined by measuring a cumulative pore volume relative to a pore diameter of cell walls by mercury porosimetry. The measurement of a cumulative pore volume by mercury porosimetry is conducted, for instance, using Autopore III 9410 available from Micromeritics, by putting a test piece cut out of a ceramic honeycomb structure in a measurement cell, evacuating the cell, introducing mercury into the cell under pressure, and measuring the volume of mercury introduced into pores in the test piece. Because higher pressure causes mercury to enter finer pores, the relation between pressure and the volume of mercury introduced into pores provides the relation between a pore diameter and a cumulative pore volume (cumulative pore volume from the maximum pore diameter to a particular pore diameter). Mercury enters successively from larger-diameter pores to smaller-diameter pores.

In a curve showing the relation between a pore diameter and a cumulative pore volume, which are measured by mercury porosimetry, the (n–1)-th measurement point from the start provides a pore diameter $D_{n-1}$ (μm) and a cumulative pore volume $V_{n-1}$ (cm$^3$/g), and the n-th measurement point provides a pore diameter $D_n$ (μm) and a cumulative pore volume $V_n$ (cm$^3$/g). The inclination $S_n$ of the cumulative pore volume curve at the n-th measurement point can be determined by the formula:

$$S_n = -(V_n - V_{n-1})/[\log D_n - \log D_{n-1}].$$

The maximum inclination of a curve of a cumulative pore volume relative to a pore diameter is preferably the maximum value of the inclination $S_n$. Measurement intervals in mercury porosimetry are preferably as small as possible. Particularly samples with small variations of pore diameters are measured preferably by as small intervals as possible.

Figure 4:
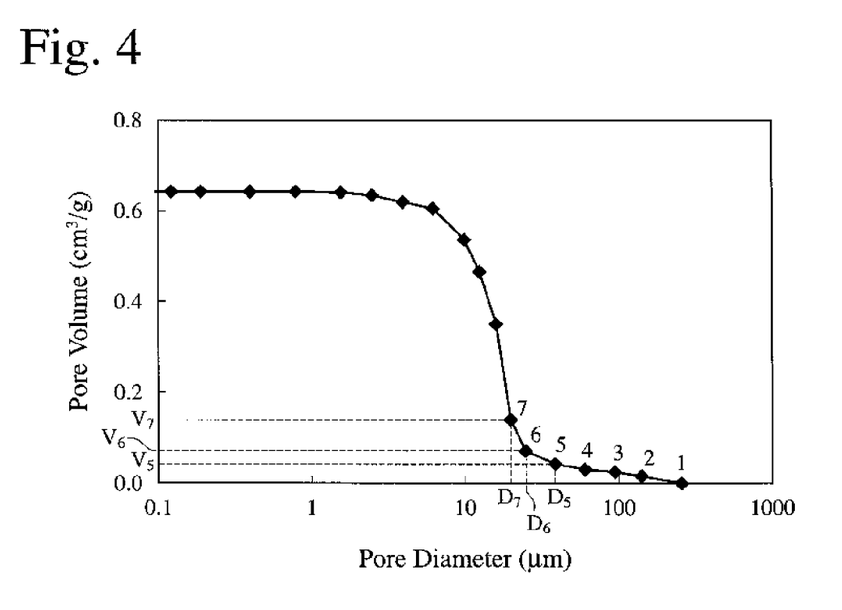
FIG. 4 is a graph showing a cumulative pore volume curve, which indicates the relation between a pore diameter and a pore volume measured by mercury porosimetry on the cell walls of a ceramic honeycomb structure.
Figure 5:
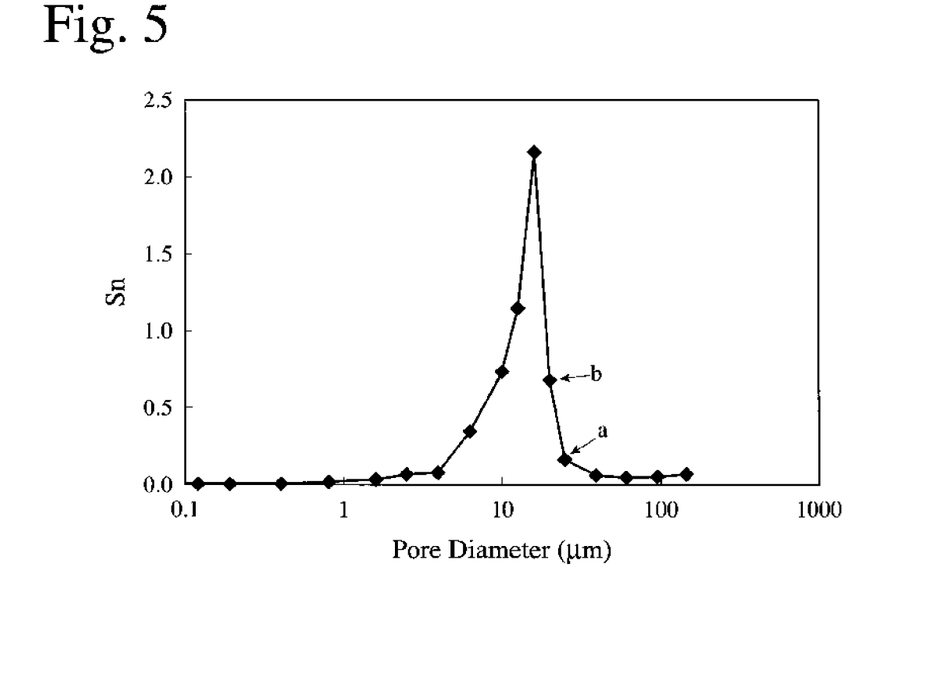
FIG. 5 is a graph showing the inclination $S_n$ of a cumulative pore volume curve plotted against a pore diameter.

FIG. 5 shows an example of the measured inclinations $S_n$. The graph of FIG. 5 is obtained from FIG. 4 showing a cumulative pore volume curve measured by mercury porosimetry. For instance, a point a in FIG. 5 has an inclination $S_6 = -(V_6 - V_5)/(\log D_6 - \log D_5)$ determined from pore diameters $D_5$ and $D_6$ and cumulative pore volumes $V_5$ and $V_6$ at the fifth and sixth measurement points from the start in the cumulative pore volume curve shown in FIG. 4, and a point b has an inclination $S_7 = -(V_7 - V_6)/(\log D_7 - \log D_6)$ determined from pore diameters $D_6$ and $D_7$ and cumulative pore volumes $V_6$ and $V_7$ at the sixth and seventh measurement points.

The porosity can be determined from the volume of mercury introduced into pores at the maximum pressure and the apparent volume of a test piece. The median pore diameter is a pore diameter (μm) at a pore volume corresponding to ½ of the total pore volume in a curve showing the relation between a pore diameter and a cumulative pore volume.

(g) Ratio D50/d50 of Median Pore Diameter D50 to Median Opening Diameter D50

The ratio D50/d50 of the median pore diameter D50 to the median opening diameter d50 is 0.65 or less. With the median pore diameter D50 inside the cell walls smaller than the median opening diameter d50 of pores open on cell wall surfaces, particularly with D50/d50 of 0.65 or less, fine PM dominant in terms of particle number is effectively captured by pores inside the cell walls smaller than pores open on cell wall surfaces, in an initial use stage. When D50/d50 exceeds 0.65, the median pore diameter d50 inside the cell walls becomes closer to that of pores open on cell wall surfaces, resulting in reduced efficiency of capturing fine PM dominant in terms of particle number by pores inside the cell walls as large as surface-open pores, in an initial use stage. The D50/d50 is preferably 0.60 or less, more preferably 0.55 or less. To prevent increase in pressure loss in an initial use stage, D50/d50 is preferably 0.1 or more.

(h) Volume of Pores Having Diameters of 10 μm or Less

In a pore distribution of cell walls measured by mercury porosimetry, the total volume of pores having diameters of 10 μm or less is preferably 5-70%, more preferably 8-60%, most preferably 10-50%, of the total pore volume, to improve pressure loss characteristics.

(i) Darcy's Coefficient of Permeability

The cell walls of the ceramic honeycomb structure preferably have a Darcy's coefficient of permeability of $0.5 \times 10^{-12}$ m$^2$ to $3 \times 10^{-12}$ m$^2$. With the Darcy's coefficient of permeability within the above range, initial pressure loss is kept low at the start of use, improving not only the PM-capturing ratio in terms of particle number in an initial use stage, but also the pressure loss characteristics when PM is captured and accumulated. When the Darcy's coefficient of permeability is less than $0.5 \times 10^{-12}$ m$^2$, it is difficult to have low pressure loss at the start of use. The Darcy's coefficient of permeability exceeding $3 \times 10^{-12}$ m$^2$ is likely to provide poor PM-capturing performance. The Darcy's coefficient of permeability is preferably $0.8 \times 10^{-12}$ m$^2$ to $2.5 \times 10^{-12}$ m$^2$.

(j) Thermal Expansion Coefficient

The ceramic honeycomb structure preferably has a thermal expansion coefficient of $13 \times 10^{-7}$/° C. or less between 20° C. and 800° C. Because a ceramic honeycomb structure with such a thermal expansion coefficient has high heat shock resistance, it sufficiently withstands practical use as a ceramic honeycomb filter for removing fine particles from exhaust gases discharged from diesel engines. The thermal expansion coefficient is preferably $3 \times 10^{-7}$/° C. to $11 \times 10^{-7}$/° C.

(k) Structure of Cell Walls

The ceramic honeycomb structure preferably has an average cell wall thickness of 9-15 mil (0.229-0.381 mm) and an average cell density of 150-300 cpsi (23.3-46.5 cells/cm$^2$). With such cell wall structure, the pressure loss is low at the start of use, resulting in an improved PM-capturing ratio in terms of particle number, and improved pressure loss characteristics when PM is captured and accumulated. The average cell wall thickness of less than 9 mil provides the cell walls with low strength, and the average cell wall thickness exceeding 15 mil makes it difficult to keep low pressure loss. The average cell density of less than 150 cpsi provides the cell walls with low strength, and the average cell density exceeding 300 cpsi makes it difficult to keep low pressure loss.

(l) Materials of Cell Walls

For use in filters for cleaning exhaust gases discharged from diesel engines, the materials of cell walls constituting the ceramic honeycomb structure are preferably heat-resistant ceramics comprising as main crystals alumina, mullite, cordierite, silicon carbide, silicon nitride, zirconia, aluminum titanate, lithium aluminum silicate, etc. Preferable among them are ceramics comprising as main crystals cordierite or aluminum titanate having excellent heat shock resistance with low thermal expansion. When the main crystal phase is cordierite, other crystal phases such as spinel, mullite, sapphirine, etc. may be contained, and glass components may also be contained. When the main crystal phase is aluminum titanate, such elements as Mg, Si, etc. may be dissolved in an aluminum titanate crystal phase, other crystal phases such as mullite, etc. may be contained, and glass components may also be contained as a grain boundary phase.

[2] Ceramic Honeycomb Filter

With the exhaust-gas-inlet or exhaust-gas-outlet side of flow paths plugged alternately, the ceramic honeycomb structure of the present invention constitutes a ceramic honeycomb filter. The use of the ceramic honeycomb structure of the present invention provides a ceramic honeycomb filter with low pressure loss at the start of use, an improved PM-capturing ratio in terms of particle number, and improved pressure loss characteristics when PM is captured and accumulated. Plugs formed in the flow paths are not necessarily formed on end surfaces on the exhaust-gas-inlet or exhaust-gas-outlet side of flow paths, but may be formed in the flow paths inside from the exhaust-gas-inlet or exhaust-gas-outlet end surface.

[3] Production Method of Ceramic Honeycomb Structure

The production method of the ceramic honeycomb structure of the present invention comprises the steps of extrusion-molding a moldable material containing a ceramic material and a pore-forming material to a predetermined molding, and drying and sintering the molding, the moldable material comprising 2-20% by mass of the pore-forming material based on 100% by mass of the ceramic material, the pore-forming material having a median diameter of 5-70 µm, and the pore-forming material being solid or hollow resin particles having inorganic powder on the surface.

Such method produces the ceramic honeycomb structure of the present invention having a large number of flow paths partitioned by porous cell walls, which has porosity of 55-80% and a median pore diameter D50 (measured by mercury porosimetry) of 5-27 µm, pores open on cell wall surfaces having an opening area ratio of 20% or more; pores open on cell wall surfaces having a median opening diameter d50 (determined from equivalent circle diameters on an area basis) of 10-45 µm, the density of pores open on cell wall surfaces having equivalent circle diameters of 10 µm or more and less than 40 µm being 350/mm$^2$ or more; the maximum inclination of a curve of a cumulative pore volume relative to a pore diameter being 1.6 or more when measured by mercury porosimetry; and a ratio D50/d50 of the median pore diameter D50 to the median opening diameter d50 being 0.65 or less.

Pores are formed in the ceramics by sintering the ceramic material and burning off the pore-forming material. Because most pores are formed by the pore-forming material, pores formed when the ceramics are sintered can be controlled by the median diameter and particle size distribution of the pore-forming material.

Sintering a molding comprising a ceramic material and resin particles (solid or hollow) having inorganic powder on the surface as the pore-forming material in the production method of the present invention, the resin particles are burned off, and the inorganic powder on the resin particle surfaces is sintered with the ceramic material, thereby forming pores. In this process, pores formed by sintering the inorganic powder on the resin particle surfaces act to communicate pores formed by sintering the ceramic material with pores formed by burning off the resin particles, improving the communications of pores from the cell wall surfaces to the inside, with the pore diameters on and in the cell walls (measured by mercury porosimetry) in the above range.

Thus, pores formed by sintering the ceramic material and pores formed by burning off the pore-forming material are in a predetermined pore diameter range providing good communication, thereby providing the ceramic honeycomb structure of the present invention with an improved PM-capturing ratio in terms of particle number in an initial use stage, and improved pressure loss characteristics when PM is captured and accumulated.

(1) Pore-Forming Material (a) Structure

The pore-forming material used in the present invention is constituted by solid or hollow resin particles and inorganic powder. The inorganic powder is preferably attached to surfaces of the solid or hollow resin particles. The pore-forming material constituted by resin particles having the inorganic powder attached to the surface can be produced by bringing the inorganic powder into contact with resin particles wet with water.

The amount of the pore-forming material added is 2-20% by mass based on 100% by mass of the ceramic material. With the amount of the pore-forming material outside this range, it is difficult to obtain cell walls having the above pores. When the amount of the pore-forming material is less than 2% by mass, too small an amount of pores are formed by the pore-forming material, failing to keep low pressure loss when PM is captured and accumulated. When the amount of the pore-forming material added exceeds 20% by mass, the PM-capturing ratio in terms of particle number decreases in an initial use stage. The amount of the pore-forming material added is preferably 3-18% by mass, more preferably 4-15% by mass.

The pore-forming material particles (including inorganic powder) have a median diameter of 5-70 µm. The median diameter of less than 5 µm reduces the PM-capturing ratio in terms of particle number in an initial use stage, failing to keep low pressure loss when PM is captured and accumulated. The median diameter exceeding 70 µm forms coarse pores, resulting in a low PM-capturing ratio in an initial use stage. The median diameter of the pore-forming material particles is preferably 8-50 µm, more preferably 10-35 µm.

In a curve showing the relation between the particle diameters of the pore-forming material particles and their cumulative volume (the accumulated volume of particles having diameters equal to or less than a particular diameter), it is preferable that the particle diameter d90 corresponding to a cumulative volume of 90% is 1.5-2.5 times the median diameter, and that the particle diameter d10 corresponding to a cumulative volume of 10% is 0.2-0.8 times the median diameter. The pore-forming material particles with such particle size distribution easily provide cell walls having the above pore structure. The particle diameters of the pore-forming material can be measured by a particle size distribution meter (Microtrack MT3000 available from Nikkiso Co., Ltd.).

The pore-forming material particles preferably have sphericity of 0.5 or more. When the sphericity of the pore-forming material particles is less than 0.5, pores open on cell wall surfaces have large circularity, resulting in many large pores deteriorating the PM-capturing efficiency in an initial use stage, and many fine pores deteriorating the pressure loss characteristics when PM is captured and accumulated. The sphericity of the pore-forming material particles is preferably 0.7 or more, more preferably 0.8 or more. The sphericity of a pore-forming material particle is a value obtained by dividing a projected area of a pore-forming material particle by the area of a circle, whose diameter is the longest straight line passing a center of gravity of the pore-forming material particle and connecting two points on a periphery of the particle, which is determined from an electron photomicrograph by an image analyzer.

(b) Resin Particles

The resin particles may be solid or hollow. Hollow resin particles are preferably foamed resin particles (porous resin particles). Both solid and hollow particles may be used as pore-forming material particles, but particularly when large ceramic honeycomb structures of 200 mm or more in outer diameter are produced, hollow resin particles generating less heat by burning are preferable, because cracking is unlikely to occur in the sintering process of moldings. Resins used for the pore-forming material particles are preferably polymethylmethacrylate, polybutylmethacrylate, polyacrylate, polystyrene, polyethylene, polyethylene terephthalate, methylmethacrylate-acrylonitrile copolymers, etc. The hollow resin particles preferably have shells as thick as 0.1-3 μm, containing gas such as hydrocarbons, etc.

(c) Inorganic Powder

The inorganic powder is preferably at least one selected from the group consisting of kaolin, silica, talc, cordierite, alumina, aluminum hydroxide, calcium carbonate and titanium oxide. When the ceramic material is a cordierite-forming material, the inorganic powder is preferably kaolin, silica, talc, cordierite, alumina and aluminum hydroxide, and talc is most preferable.

To form well communicating pores by firing the ceramic material and the inorganic powder, the median diameter of the inorganic powder is preferably 0.5-15 μm, more preferably 0.6-12 μm. The particle sizes of the inorganic powder can be measured by a particle size distribution meter (Microtrack MT3000 available from Nikkiso Co., Ltd.). If the inorganic powder before attached to the resin particles is not available, the inorganic powder is separated from the pore-forming material by ultrasonic vibration, etc.

It is preferable to select the median diameter d of the inorganic powder relative to the median diameter D of the solid or hollow resin particles, such that d/D is 0.5 or less. With d/D in this range, the inorganic powder can be well attached to the resin particles. If the inorganic powder were selected such that d/D exceeds 0.5, the inorganic powder would not be easily attached to the resin particles, resulting in the reduced effect of the inorganic powder of making pores formed by sintering the ceramic material communicate with pores formed by burning off the resin particles, so that pores do not have good communication from the cell wall surfaces to the inside. d/D is preferably 0.01-0.45.

In the pore-forming material particles, a volume ratio of the resin particles to the inorganic powder (resin particles/inorganic powder) is preferably 0.1-200. With the volume ratio of the resin particles to the inorganic powder in this range, pores formed by sintering the ceramic material and pores formed by burning off the pore-forming material have good communication within a predetermined pore diameter range. The volume ratio is preferably 0.5-150.

(2) Ceramic Material

The ceramic material is preferably a cordierite-forming material. The cordierite-forming material is obtained by mixing silica source powder, alumina source powder and magnesia source powder, such that the resultant main crystal is cordierite having a chemical composition comprising as main components 42-56% by mass of $SiO_2$, 30-45% by mass of $Al_2O_3$ and 12-16% by mass of MgO. Pores formed in the ceramic comprising cordierite as a main crystal are constituted by pores formed by sintering silica and talc in the cordierite-forming material, and pores formed by burning off the pore-forming material. Among them, silica and the pore-forming material contribute to the formation of most pores. Accordingly, by adjusting their particle sizes and particle size distributions, pores formed by sintering the cordierite ceramic can be controlled.

(a) Silica

It is known that silica is more stable than other materials up to high temperatures, and melt-diffused at 1300° C. or higher to form pores. Accordingly, the presence of 15-25% by mass of silica provides a desired amount of pores. With more than 25% by mass of silica contained, the amounts of kaolin and/or talc, other silica sources, should be reduced to keep cordierite as a main crystal, decreasing the effect of kaolin of reducing thermal expansion (such effect is obtained by the orientation of kaolin during extrusion-molding), and thus resulting in low heat shock resistance. On the other hand, when silica is less than 15% by mass, the number of pores open on cell wall surfaces is small, likely failing to achieve low pressure loss when PM is captured and accumulated. The amount of silica is preferably 17-23% by mass. When a silica-containing, pore-forming material is used as the inorganic powder, the amount of silica in the pore-forming material is adjusted, thereby properly changing the amount of silica contained in the cordierite-forming material.

The median diameter of silica is preferably 20-30 μm to form the cell wall structure of the ceramic honeycomb structure of the present invention. Combining silica particles having such a median diameter with the pore-forming material, an extremely sharp pore distribution is obtained. The median diameter of silica of less than 20 μm increases the percentage of fine pores increasing pressure loss when PM is captured and accumulated, among pores open on cell wall surfaces. On the other hand, when the median diameter of silica exceeds 30 μm, there are many large pores reducing the PM-capturing efficiency in an initial use stage. The median diameter of silica is preferably 22-28 μm.

It is preferable that silica particles having particle diameters of 10 μm or less are 5% by mass or less, and that silica particles having particle diameters of 100 μm or more are 5% by mass or less. A combination of silica particles having such particle size distribution with the pore-forming material provides a sharper pore distribution. More than 5% by mass of silica particles having particle diameters of 10 μm or less among pores open on cell wall surfaces provide an increased percentage of fine pores increasing pressure loss when PM is captured and accumulated. The percentage of silica particles having particle diameters of 10 μm or less is preferably 3% or less by mass. More than 5% by mass of silica particles having particle diameters of 100 μm or more provide many large pores reducing the PM-capturing ratio in an initial use stage. The percentage of silica particles having particle diameters of 100 μm or more is preferably 3% or less by mass.

The silica particles preferably have sphericity of 0.5 or more. When the sphericity of silica particles is less than 0.5, pores open on cell wall surfaces have large circularity, resulting in many large pores reducing the PM-capturing ratio in an initial use stage, and many fine pores increasing pressure loss when PM is captured and accumulated. The sphericity of silica particles is preferably 0.6 or more, more preferably 0.7 or more. The sphericity of a silica particle is a value obtained by dividing a projected area of a silica particle by the area of a circle, whose diameter is the longest straight line passing a center of gravity of the silica particle and connecting two points on a periphery of the particle, which is determined from an electron photomicrograph by an image analyzer.

Though silica particles may be crystalline or amorphous, they are preferably amorphous to control the particle size distribution. Amorphous silica can be obtained by melting high-purity, natural silica stone at high temperatures and pulverizing the resultant ingot. Though silica particles may contain $Na_2O$, $K_2O$ and CaO as impurities, the total amount of the above impurities is preferably 0.1% or less to avoid a large thermal expansion coefficient.

High-sphericity silica particles can be obtained by spraying finely pulverized, high-purity, natural silica stone into a high-temperature flame. Spraying into a high-temperature flame causes the melting and spheroidization of silica particles simultaneously, providing spherical, amorphous silica. The spherical silica particles are preferably adjusted with respect to particle size by classification, etc.

(b) Kaolin

As a silica material for the cordierite-forming material, kaolin powder can be used in addition to silica powder. 1-15% by mass of kaolin powder is preferably contained. More than 15% by mass of kaolin powder likely makes it difficult to control the percentage of pores having diameters of less than 2 μm to 10% or less by volume in the ceramic honeycomb structure, and less than 1% by mass of kaolin powder provides the ceramic honeycomb structure with a large thermal expansion coefficient. The amount of kaolin powder is more preferably 4-8% by mass.

When kaolin particles are oriented such that their c-axes are perpendicular to the longitudinal direction of the extrusion-molded honeycomb structure, the c-axes of cordierite crystals are in parallel to the longitudinal direction of the honeycomb structure, providing the honeycomb structure with a small thermal expansion coefficient. The shape of kaolin particles has large influence on the orientation of kaolin particles. The cleavage index of kaolin particles, which is an index indicating the shape of kaolin particles quantitatively, is preferably 0.80 or more, more preferably 0.85 or more. The cleavage index of kaolin particles can be determined by measuring the X-ray diffraction of press-molded kaolin particles to obtain the X-ray diffraction peak intensities $I_{(200)}$, $I_{(020)}$ and $I_{(002)}$ of (200), (020) and (002) planes of kaolin particles, and using the following formula:

$$\text{Cleavage index} = I_{(002)}/[I_{(200)} + I_{(020)} + I_{(002)}].$$

The larger the cleavage index, the more the kaolin particles are oriented.

(c) Talc

The cordierite-forming material preferably comprises talc having a median diameter of 1-15 μm. The cell walls have pores formed by sintering silica and talc in the cordierite-forming material and pores formed by burning off the pore-forming material, and pores formed by talc particles having a median diameter of 1-15 μm, smaller than the median diameters of silica and the pore-forming material, between pores formed by silica and pores formed by the pore-forming material. Pores formed by talc particles act to communicate pores formed by silica with pores formed by the pore-forming material, improving the communication of pores inside the cell walls. When the median diameter of talc is less than 1 μm, poor communication of pores is obtained, resulting in low pressure loss characteristics when PM is captured and accumulated. The median diameter of talc exceeding 15 μm increases the percentage of large pores lowering the PM-capturing ratio in an initial use stage. The median diameter of talc is preferably 2-12 μm, more preferably 3-10 μm.

In a curve showing the relation between a talc particle diameter and a cumulative volume (cumulative volume of particles having diameters equal to or less than a particle diameter), a particle diameter d90 at a cumulative volume corresponding to 90% of the total volume is preferably 40 μm or less. When the particle diameter d90 exceeds 40 μm, the percentage of large pores reducing the PM-capturing ratio in an initial use stage increases. The particle diameter is preferably 35 μm or less, more preferably 30 μm or less.

To reduce the thermal expansion coefficient of the ceramic honeycomb structure whose main crystal phase is cordierite, talc particles are preferably in a plate-like shape. The morphology index, which is a measure of the platy character of talc particles, is preferably 0.50 or more, more preferably 0.60 or more, most preferably 0.70 or more. The above morphology index is, as described in U.S. Pat. No. 5,141,686, determined by the following formula:

Morphology index=$Ix/(Ix+2Iy)$, wherein Ix and Iy respectively represent the diffraction intensities of (004) and (020) planes of talc, which are obtained by the X-ray diffraction measurement of planar talc particles. The larger the morphology index, the more platy the talc particles.

Talc may contain as impurities $Fe_2O_3$, CaO, $Na_2O$, $K_2O$, etc. The amount of $Fe_2O_3$ is preferably 0.5-2.5% by mass in the magnesia source to obtain the desired particle size distribution. The total amount of $Na_2O$, $K_2O$ and CaO is preferably 0.50% or less by mass to have a low thermal expansion coefficient.

The amount of talc added to the cordierite-forming material is preferably 40-43% by mass to form cordierite as a main crystal. When the pore-forming material comprising solid or hollow resin particles with talc as inorganic powder is used, the amount of talc contained in the pore-forming material should be taken into account, to adjust the amount of talc added to the cordierite-forming material.

(d) Alumina

The alumina materials are preferably aluminum oxide and/or aluminum hydroxide because of little impurities. The total amount of $Na_2O$, $K_2O$ and CaO, impurities in aluminum oxide and aluminum hydroxide, is preferably 0.5% or less by mass, more preferably 0.3% or less by mass, most preferably 0.1% or less by mass. When aluminum hydroxide is used, its amount in the cordierite-forming material is preferably 6-42% by mass. When aluminum oxide is used, its amount in the cordierite-forming material is preferably 35% or less by mass.

(3) Production Method

The ceramic honeycomb structure is produced by dry-mixing the ceramic material and the pore-forming material with a binder, and if necessary, additives such as a dispersant, a surfactant, etc., and then blending it with water, extruding the resultant moldable material from a known honeycomb-structure-molding die by a known extrusion-molding method, drying the resultant honeycomb molding, machining the end surfaces and periphery, etc. of the molding, if necessary, and then sintering it.

Sintering is conducted at controlled heating and cooling speeds in a continuous or batch furnace. When the ceramic material is a cordierite-forming material, it is kept at 1350-1450° C. for 1-50 hours to form cordierite sufficiently as main crystals, and then cooled to room temperature. Particularly in the case of a large ceramic honeycomb structure having an outer diameter of 150 mm or more and a length of 150 mm or more, the temperature-elevating speed is preferably 0.2-10° C./hour in a binder-decomposing temperature range, for example, between 150° C. and 350° C., and 5-20° C./hour in a cordierite-forming temperature range, for example, between 1150° C. and 1400° C., thereby preventing cracking in the molding in the sintering process. The cooling is preferably conducted at a speed of 20-40° C./hour particularly in a temperature range of 1400° C. to 1300° C.

The resultant honeycomb structure is provided with plugs by a known method to provide a ceramic honeycomb filter with ends of desired flow paths plugged. Plugs may be formed before sintering.

The embodiments of the present invention will be explained in detail below.

Examples 1-24 and Comparative Examples 1-6

Figure 8:
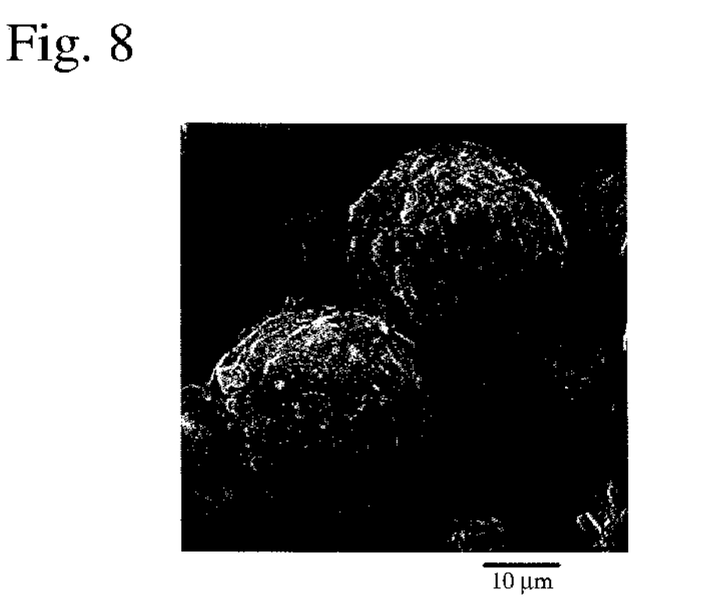
FIG. 8 is an electron photomicrograph showing pore-forming material particles (pore-forming material A) used in Example 1.

Silica powder, kaolin powder, talc powder, alumina powder and aluminum hydroxide powder having particle shapes (particle sizes, particle size distributions, etc.) and impurities shown in Tables 1-4 were mixed in the formulations shown in Table 6, to obtain cordierite-forming material powders having a chemical composition comprising 50% by mass of $SiO_2$, 36% by mass of $Al_2O_3$ and 14% by mass of MgO. The amounts of ceramic materials shown in Table 6 are normalized such that the total amount of ceramic materials (including talc or silica contained in the pore-forming materials) is 100 parts by mass. Each of these cordierite-forming material powders was mixed with a pore-forming material having the particle shape shown in Table 5 in the amount shown in Table 6. After adding methylcellulose, the resultant mixture was blended with water to prepare a moldable ceramic material composed of cordierite-forming materials. Other pore-forming materials than the pore-forming material G were hollow resin particles in which a butane gas was encapsulated. FIG. 8 shows an electron photomicrograph of the pore-forming material A used in Example 1.

With respect to silica powder, kaolin powder, talc powder, alumina powder, aluminum hydroxide powder and the pore-forming material, the particle size and particle size distribution were measured by a particle size distribution meter (Microtrack MT3000 available from Nikkiso Co., Ltd.), and the particle size distribution was used to determine the percentage of particles having diameters of 10 μm or less, the percentage of particles having diameters of 100 μm or more, d90, d10, etc. The sphericity of each silica particle was determined from an electron photomicrograph of the particle by an image analyzer by the formula of A1/A2, wherein A1 was a projected area of silica particle, and A2 was an area of a circle having a diameter corresponding to the longest straight line passing a center of gravity of the silica particle and connecting two points on a periphery of the silica particle, and the resultant sphericity values of 20 silica particles were averaged to obtain the sphericity of silica particles.

Figure 6:
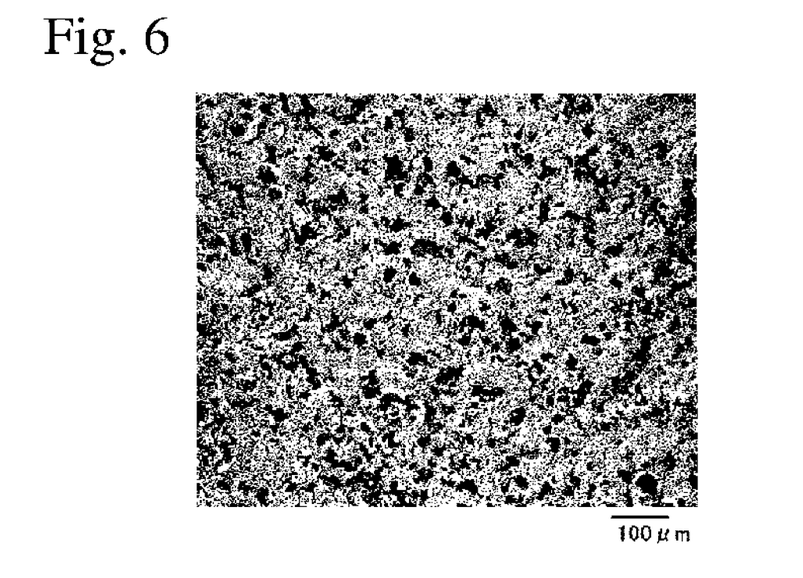
FIG. 6 is an electron photomicrograph showing a cell wall surface of the ceramic honeycomb structure of Example 7 within the present invention.
Figure 7:
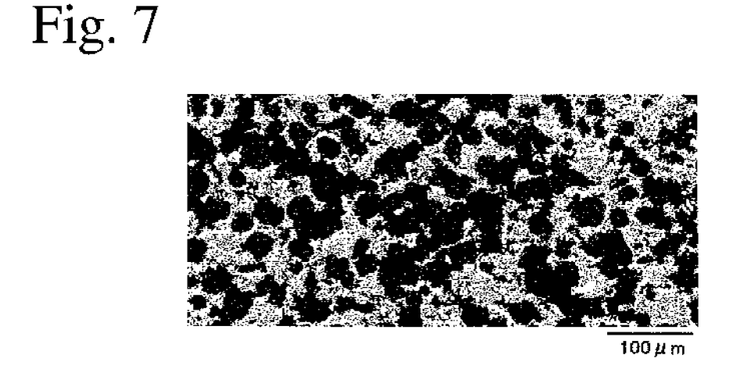
FIG. 7 is an electron photomicrograph showing the cross section of a cell wall of the ceramic honeycomb structure of Example 7 within the present invention.

The resultant moldable material was extruded to form a honeycomb structure molding having a cell wall thickness of 13 mil (0.33 mm) and a cell density of 255 cpsi (39.5 cells/cm²), dried, machined to remove its peripheral portions, and sintered in a furnace for 200 hours by a schedule comprising temperature elevation at an average speed of 10° C./hour from room temperature to 150° C., at an average speed of 2° C./hour from 150° C. to 350° C., at an average speed of 20° C./hour from 350° C. to 1150° C., and at an average speed of 15° C./hour from 1150° C. to 1400° C., keeping the highest temperature of 1410° C. for 24 hours, and cooling at an average speed of 30° C./hour from 1400° C. to 1300° C., and at an average speed of 80° C./hour from 1300° C. to 100° C. Peripheries of the sintered ceramic honeycombs were coated with a skin material comprising amorphous silica and colloidal silica, and dried to obtain the ceramic honeycomb structures of Examples 1-24 and Comparative Examples 1-6 each having an outer diameter of 266.7 mm and a length of 304.8 mm. The cell wall surface and cross section of the ceramic honeycomb structure of Example 7 were observed by electron microscope. The results are shown in FIGS. 6 and 7.

Flow path ends of each ceramic honeycomb structure were alternately plugged with a cordierite-forming, plugging material slurry, which was dried and sintered to produce each cordierite-type ceramic honeycomb filter of Examples and Comparative Examples. The sintered plugs were as long as 7-10 mm. A pair of the same ceramic honeycomb filters were produced in each Example and Comparative Example.

Example 25

32.0 parts by mass of titania powder having a median diameter of 1.6 μm, 56.1 parts by mass of alumina powder having a median diameter of 5 μm, 3.0 parts by mass of silica powder having a median diameter of 20 μm, and 3.0 parts by mass of magnesia powder having a median diameter of 2 μm as ceramic material powders having an aluminum titanate composition, a molding aid, and 7.0 parts by mass of titanium-oxide-coated, hollow resin particles having a median diameter of 20 μm and sphericity of 0.92 as a pore-forming material were mixed, blended, and extruded to obtain a honeycomb structure molding having an outer diameter of 50 mm, a length of 90 mm, a cell wall thickness of 10 mil (0.25 mm), and a cell density of 300 cpsi (46.5 cells/cm²). After drying, the molding was machined to remove its peripheral portions, and sintered by a schedule comprising temperature elevation at a heating speed of 50° C./hour from room temperature to 150° C., at a heating speed of 10° C./hour from 150° C. to 300° C., at a heating speed of 50° C./hour from 300° C. to 1000° C., and at a heating speed of 30° C./hour from 1000° C. or higher, keeping the highest temperature of 1600° C. for 10 hours, and cooling at a speed of 70° C./hour from 1600° C. to room temperature. A periphery of the sintered ceramic honeycomb was coated with a skin material comprising amorphous silica and colloidal silica, and dried to obtain a ceramic honeycomb structure having an outer diameter of 150 mm and a length of 200 mm.

Flow path ends of this ceramic honeycomb structure were alternately plugged with an aluminum-titanate-forming, plugging material slurry, and the plugging material slurry was dried and sintered to produce a ceramic honeycomb filter made of aluminum titanate. The sintered plugs were as long as 7-10 mm. A pair of the same ceramic honeycomb filters were produced.

With respect to each ceramic honeycomb filter produced in each of Examples 1-25 and Comparative Examples 1-6, pores open on cell wall surfaces were measured by image analysis and mercury porosimetry, and the Darcy's coefficient of permeability was measured. Their measurement methods are described below. The results are shown in Table 7.

The opening area ratio of pores open on cell wall surfaces was determined by filtering and analyzing an electron photomicrograph of a surface of a cell wall cut out of each honeycomb filter by an image analyzer (Image-Pro Plus Ver. 6.3 available from Media Cybernetics, enhancement filter: LoPass, Option: 3×3, the number of passes: 2, and strength: 8), and expressed as a percentage (%) to the total opening area of pores per an area of the measured field.

The median opening diameter d50 of pores open on cell wall surfaces was determined by calculating an equivalent circle diameter of each pore open on cell wall surfaces by the formula of $2 \times (S/\pi)^{1/2}$, wherein S represents an area of the pore obtained by image analysis, plotting a cumulative area of pores open on cell wall surfaces (accumulated opening area of pores having diameters equal to or less than a particular equivalent circle diameter) against the equivalent circle diameter to obtain a graph shown in FIG. 3, and finding an equivalent circle diameter at which a cumulative area corresponded to 50% of the total pore area in FIG. 3.

The density of pores open on cell wall surfaces having equivalent circle diameters of 10 μm or more and less than 40 μm were determined by calculating the number of pores having equivalent circle diameters of 10 μm or more and less than 40 μm per a unit area of the cell wall surface.

The total pore volume, the porosity, the median pore diameter D50, the inclination $S_n$ of a cumulative pore volume curve, and the volume of pores of 10 μm or less were determined by mercury porosimetry.

The mercury porosimetry was conducted by setting a test piece (10 mm×10 mm×10 mm) cut out of each ceramic honeycomb filter in a measurement cell of Autopore III available from Micromeritics, evacuating the cell, and then introducing mercury into the cell under pressure to obtain the relation between pressure and the volume of mercury introduced into pores in the test piece. The above pressure-volume relation provided the relation between a pore diameter and a cumulative pore volume. With mercury pressure of 0.5 psi (0.35× $10^{-3}$ kg/mm²), the pore diameter was calculated from the pressure, using a contact angle of 130° and a surface tension of 484 dyne/cm.

The porosity was calculated from the measured total pore volume, using 2.52 g/cm³ as the true density of cordierite.

The inclination $S_n$ of a cumulative pore volume curve and the volume of pores of 10 μm or more were determined from a curve of a cumulative pore volume relative to a pore diameter. The inclination $S_n$ of a cumulative pore volume curve at the n-th measurement point can be determined from a pore diameter $D_{n-1}$ (μm) and a cumulative pore volume $V_{n-1}$ (cm³/g) at the (n−1)-th measurement point from the start of measurement, and a pore diameter $D_n$ (μm) and a cumulative pore volume $V_n$ (cm³/g) at the n-th measurement point, by the formula of $S_n = -(V_n - V_{n-1})/(\log D_n - \log D_{n-1})$. The maximum inclination was determined from $S_n$ at each measurement point.

The Darcy's coefficient of permeability was determined as the maximum permeability measured by Perm Automated Porometer (registered trademark) 6.0 available from Porous Materials, Inc., with the flow rate of air increasing from 30 cc/sec to 400 cc/sec.

The thermal expansion coefficient (CTE) between 20° C. and 800° C. was measured on another test piece cut out of each honeycomb filter.

The initial pressure loss, the pressure loss when 2 g/liter of soot was captured, and the capturing efficiency were measured on another ceramic honeycomb filter produced in each of Examples 1-25 and each Comparative Examples 1-6. The results are shown in Table 7.

The initial pressure loss was measured on a ceramic honeycomb filter fixed to a pressure loss test stand, to which air was supplied in a flow rate of 10 Nm³/min, and expressed by pressure difference between the inlet side and the outlet side (pressure loss). The initial pressure loss was evaluated as follows:
  Excellent When the pressure loss was 0.6 kPa or less,
  Good When the pressure loss was more than 0.6 kPa and 0.8 kPa or less,
  Fair When the pressure loss was more than 0.8 kPa and 1.0 kPa or less, and
  Poor When the pressure loss was more than 1.0 kPa.

The pressure loss when 2 g/liter of soot was captured (soot-capturing pressure loss) was measured on a ceramic honeycomb filter fixed to a pressure loss test stand, to which combustion soot having an average particle size of 0.042 μm was supplied at a speed of 3 g/h together with 10 Nm³/min of air, and expressed by pressure difference between the inlet side and the outlet side (pressure loss) when 2 g of soot was captured per 1 liter of the filter volume. The soot-capturing pressure loss was evaluated as follows:
  Excellent When the pressure loss was 1.0 kPa or less,
  Good When the pressure loss was more than 1.0 kPa and 1.3 kPa or less,
  Fair When the pressure loss was more than 1.3 kPa and 1.5 kPa or less, and
  Poor When the pressure loss was more than 1.5 kPa.

The capturing efficiency was measured on a ceramic honeycomb filter fixed to a pressure loss test stand, to which combustion soot having an average particle size of 0.042 μm was supplied at a speed of 3 g/h together with 10 Nm³/min of air. The numbers of combustion soot particles flowing into and out of the honeycomb filter were measured every 1 minute by a scanning mobility particle sizer (SMPS, Model 3936 available from TIS), and the capturing efficiency was determined from the number of combustion soot particles ($N_{in}$) flowing into the honeycomb filter, and the number of combustion soot particles ($N_{out}$) flowing out of the honeycomb filter, from 3 minutes to 4 minutes after starting the supply of combustion soot, by the formula of $(N_{in} - N_{out})/N_{in}$. The capturing efficiency was evaluated as follows:
Excellent When the capturing efficiency was 98% or more.
Good When the capturing efficiency was less than 98% and 96% or more,
Fair When the capturing efficiency was less than 96% and 95% or more, and
Poor When the capturing efficiency was less than 95%.

TABLE 1

| Material | Median Diameter (μm) | Percentage of Pores (%) ≤10 μm | Percentage of Pores (%) ≥100 μm | Sphericity | Impurities (%) CaO | Impurities (%) Na₂O | Impurities (%) K₂O |
|---|---|---|---|---|---|---|---|
| Silica A | 30 | 1.0 | 4.2 | 0.85 | 0.001 | 0.0024 | 0.0026 |
| Silica B | 20 | 4.2 | 0.7 | 0.85 | 0.001 | 0.0024 | 0.0026 |
| Silica C | 25 | 1.8 | 1.0 | 0.50 | 0.001 | 0.0019 | 0.0021 |
| Silica D | 25 | 1.8 | 1.0 | 0.84 | 0.001 | 0.0019 | 0.0021 |
| Silica E | 40 | 0.9 | 7.0 | 0.83 | 0.001 | 0.0024 | 0.0026 |
| Silica F | 15 | 7.0 | 1.5 | 0.83 | 0.001 | 0.0024 | 0.0026 |
| Silica G | 17 | 30.0 | 11.0 | 0.20 | 0.001 | 0.0024 | 0.0026 |

TABLE 2

| Material | Median Diameter (μm) | Cleavage Index | Impurities (%) CaO | Impurities (%) Na₂O | Impurities (%) K₂O |
|---|---|---|---|---|---|
| Kaolin A | 3.1 | 0.95 | 0.20 | 0.03 | 0.09 |
| Kaolin B | 0.3 | 0.75 | 0.20 | 0.03 | 0.09 |

TABLE 3

| Material | Median Diameter (μm) | d90 (μm) | Morphology Index | Impurities (%) CaO | Impurities (%) Na₂O | Impurities (%) K₂O | Impurities (%) Fe₂O₃ |
|---|---|---|---|---|---|---|---|
| Talc A | 7.5 | 20.0 | 0.83 | 0.50 | 0.001 | 0.001 | 1.1 |
| Talc B | 7.5 | 20.0 | 0.77 | 0.51 | 0.001 | 0.001 | 1.1 |
| Talc C | 1.0 | 10.0 | 0.83 | 0.52 | 0.001 | 0.001 | 1.1 |
| Talc D | 10.0 | 26.0 | 0.83 | 0.52 | 0.001 | 0.001 | 1.1 |
| Talc E | 0.5 | 9.0 | 0.83 | 0.52 | 0.001 | 0.001 | 1.0 |
| Talc F | 17.0 | 65.0 | 0.84 | 0.51 | 0.001 | 0.001 | 1.0 |
| Talc G | 7.7 | 16.0 | 0.56 | 0.50 | 0.001 | 0.001 | 1.0 |
| Talc H | 12.0 | 35.0 | 0.72 | 0.50 | 0.001 | 0.001 | 1.0 |

TABLE 4

| Material | Median Diameter (μm) | Impurities (%) CaO | Na$_2$O | K$_2$O |
|---|---|---|---|---|
| Alumina A | 6.1 | 0.001 | 0.30 | 0.001 |
| Alumina B | 4.2 | 0.001 | 0.31 | 0.001 |
| Aluminum Hydroxide | 1.8 | 0.001 | 0.05 | 0.001 |

TABLE 5

| Pore-Forming Material | Type | Median Diameter (μm) | d90 (μm) | d10 (μm) | Sphericity |
|---|---|---|---|---|---|
| A | Talc-coated, hollow resin | 20.0 | 40.2 | 9.8 | 0.92 |
| B | Talc-coated, hollow resin | 5.0 | 12.0 | 2.6 | 0.92 |
| C | Talc-coated, hollow resin | 70.0 | 140.0 | 34.0 | 0.91 |
| D | Talc-coated, hollow resin | 85.0 | 172.0 | 43.0 | 0.92 |
| E | Talc-coated, hollow resin | 2.0 | 4.5 | 0.9 | 0.92 |
| F | Silica-coated, hollow resin | 20.0 | 40.1 | 10.0 | 0.92 |
| G | Graphite | 20.0 | 62.0 | 3.0 | 0.50 |
| H | Hollow resin | 41.0 | 110.0 | 8.0 | 0.91 |
| I | Talc-coated, hollow resin | 70.0 | 140.0 | 34.0 | 0.90 |
| J | Titania-coated, hollow resin | 20.0 | 39.0 | 9.5 | 0.90 |

| Pore-Forming Material | Median Diameter D (μm) of Resin Particles | Median Diameter d (μm) of Inorganic Powder | d/D*$^1$ | Volume Ratio (Resin Particles/Inorganic Particles) | Shell Thickness (μm) of Hollow Resin Particles |
|---|---|---|---|---|---|
| A | 18.0 | 2.0 | 0.11 | 1.7 | 1.0 |
| B | 4.7 | 0.8 | 0.17 | 1.2 | 0.3 |
| C | 63.0 | 15.0 | 0.24 | 0.4 | 2.0 |
| D | 74.0 | 23.0 | 0.31 | 0.4 | 3.0 |
| E | 1.9 | 0.3 | 0.16 | 3.8 | 0.8 |
| F | 18.0 | 1.5 | 0.08 | 2.3 | 1.0 |
| G*$^2$ | — | — | — | — | — |
| H*$^2$ | 41.0 | — | — | — | 2.0 |
| I | 61.0 | 17.0 | 0.28 | 0.3 | 1.5 |
| J | 19.0 | 3.0 | 0.16 | 1.6 | 1.5 |

Note:
*$^1$ A ratio of the median diameter d of the inorganic powder to the median diameter D of the resin particles.
*$^2$ Pore-forming materials G and H do not contain inorganic powder.

TABLE 6

| No. | Silica Type | Silica Parts by mass | Kaolin Type | Kaolin Parts by mass | Talc Type | Talc Parts by mass |
|---|---|---|---|---|---|---|
| Example 1 | Silica A | 20.5 | kaolin A | 6.0 | talc A | 36 |
| Example 2 | Silica B | 20.5 | kaolin A | 6.0 | talc A | 36 |
| Example 3 | Silica C | 20.5 | kaolin A | 6.0 | talc A | 36 |
| Example 4 | Silica D | 20.4 | kaolin A | 6.0 | talc B | 36 |
| Example 5 | Silica D | 20.4 | kaolin A | 6.0 | talc A | 36 |
| Example 6 | Silica D | 20.4 | kaolin B | 6.0 | talc A | 36 |
| Example 7 | Silica D | 20.5 | kaolin A | 6.0 | talc A | 36 |
| Example 8 | Silica D | 20.5 | kaolin A | 6.0 | talc C | 36 |
| Example 9 | Silica D | 20.5 | kaolin A | 6.0 | talc D | 36 |
| Example 10 | Silica D | 20.5 | kaolin A | 6.0 | talc E | 36 |
| Example 11 | Silica D | 15.0 | kaolin A | 12.4 | talc A | 36 |
| Example 12 | Silica D | 25.0 | kaolin A | 1.0 | talc A | 36 |
| Example 13 | Silica D | 20.5 | kaolin A | 6.0 | talc A | 36 |
| Example 14 | Silica D | 20.5 | kaolin A | 6.0 | talc A | 40.5 |
| Example 15 | Silica D | 20.5 | kaolin A | 6.0 | talc A | 29 |
| Example 16 | Silica E | 20.5 | kaolin A | 6.0 | talc A | 36 |
| Example 17 | Silica F | 20.5 | kaolin A | 6.0 | talc A | 36 |
| Example 18 | Silica D | 13.0 | kaolin A | 15.0 | talc A | 36 |
| Example 19 | Silica D | 15.5 | kaolin A | 6.0 | talc A | 41 |
| Example 20 | Silica D | 20.5 | kaolin A | 6.0 | talc A | 39 |
| Example 21 | Silica D | 20.5 | kaolin A | 6.0 | talc A | 36 |
| Example 22 | Silica D | 20.5 | kaolin A | 6.0 | talc F | 36 |
| Example 23 | Silica D | 20.5 | kaolin A | 6.0 | talc G | 36 |
| Example 24 | Silica D | 20.5 | kaolin A | 6.0 | talc G | 36 |
| Comp. Ex. 1 | Silica D | 20.5 | kaolin A | 6.0 | talc A | 36 |
| Comp. Ex. 2 | silica D | 20.5 | kaolin A | 6.0 | talc A | 36 |
| Comp. Ex. 3 | silica D | 18.0 | kaolin A | 6.0 | talc F | 41.4 |
| Comp. Ex. 4 | silica D | 20.5 | kaolin A | 6.0 | talc A | 42 |
| Comp. Ex. 5 | silica D | 20.5 | kaolin A | 6.0 | talc A | 36 |
| Comp. Ex. 6 | silica D | 20.5 | kaolin A | 6.0 | talc A | 41.3 |

| No. | Alumina Type | Alumina Parts by mass | Aluminum Hydroxide Parts by mass | Pore-Forming Material Type | Pore-Forming Material Parts by mass |
|---|---|---|---|---|---|
| Example 1 | Alumina A | 31.5 | 0.0 | A | 7.0 |
| Example 2 | Alumina A | 31.5 | 0.0 | A | 7.0 |
| Example 3 | Alumina A | 31.5 | 0.0 | A | 7.0 |
| Example 4 | Alumina B | 31.6 | 0.0 | B | 7.0 |
| Example 5 | Alumina B | 31.6 | 0.0 | C | 7.0 |
| Example 6 | Alumina B | 31.6 | 0.0 | A | 7.0 |
| Example 7 | Alumina A | 31.5 | 0.0 | A | 7.0 |
| Example 8 | Alumina A | 31.5 | 0.0 | A | 7.0 |
| Example 9 | Alumina A | 31.5 | 0.0 | A | 7.0 |
| Example 10 | Alumina A | 31.5 | 0.0 | A | 7.0 |
| Example 11 | Alumina A | 31.5 | 0.0 | A | 7.0 |
| Example 12 | Alumina A | 31.5 | 0.0 | A | 7.0 |
| Example 13 | Alumina A | 23.0 | 11.0 | A | 7.0 |
| Example 14 | Alumina A | 31.5 | 0.0 | A | 2.0 |
| Example 15 | Alumina A | 31.5 | 0.0 | A | 20.0 |
| Example 16 | Alumina A | 31.5 | 0.0 | A | 7.0 |
| Example 17 | Alumina A | 31.5 | 0.0 | A | 7.0 |
| Example 18 | Alumina A | 31.5 | 0.0 | A | 7.0 |
| Example 19 | Alumina A | 31.5 | 0.0 | F | 7.0 |
| Example 20 | Alumina A | 31.5 | 0.0 | A | 4.0 |
| Example 21 | Alumina A | 31.5 | 0.0 | A | 15.0 |
| Example 22 | Alumina A | 31.5 | 0.0 | A | 7.0 |
| Example 23 | Alumina A | 31.5 | 0.0 | A | 7.0 |
| Example 24 | alumina A | 31.5 | 0.0 | I | 7.0 |
| Comp. Ex. 1 | alumina A | 31.5 | 0.0 | D | 7.0 |
| Comp. Ex. 2 | alumina A | 31.5 | 0.0 | E | 7.0 |
| Comp. Ex. 3 | alumina A | 23.3 | 11.3 | H | 10.0 |
| Comp. Ex. 4 | alumina A | 31.5 | 0.0 | G | 20.0 |
| Comp. Ex. 5 | alumina A | 31.5 | 0.0 | A | 25.0 |
| Comp. Ex. 6 | alumina A | 31.5 | 0.0 | A | 1.0 |

TABLE 7

| No. | Pores Open on Cell Wall Surfaces Opening Area Ratio (%) | Median Diameter d50 (Equivalent Circle Diameter) (μm) | Density of Pores of 10 μm or More and Less Than 40 μm (/mm$^2$) |
|---|---|---|---|
| Example 1 | 49.1 | 29.6 | 680 |
| Example 2 | 20.2 | 16.3 | 880 |
| Example 3 | 20.3 | 19.5 | 618 |
| Example 4 | 21.9 | 16.5 | 930 |
| Example 5 | 49.2 | 39.5 | 365 |
| Example 6 | 31.4 | 25.5 | 560 |
| Example 7 | 37.8 | 32.6 | 412 |
| Example 8 | 20.1 | 17.5 | 760 |
| Example 9 | 41.7 | 37.1 | 351 |
| Example 10 | 20.8 | 18.8 | 680 |
| Example 11 | 21.2 | 22.5 | 485 |
| Example 12 | 59.3 | 31.0 | 715 |
| Example 13 | 34.1 | 25.0 | 631 |
| Example 14 | 20.3 | 23.0 | 444 |
| Example 15 | 55.8 | 30.6 | 690 |
| Example 16 | 49.9 | 39.8 | 365 |
| Example 17 | 20.3 | 17.9 | 732 |
| Example 18 | 21.1 | 25.4 | 378 |
| Example 19 | 35.7 | 28.8 | 498 |
| Example 20 | 21.0 | 23.5 | 440 |
| Example 21 | 41.3 | 31.5 | 482 |

TABLE 7-continued

| | Measurement Results of Pores by Mercury Porosimetry | | | | |
|---|---|---|---|---|---|
| No. | Total Pore Volume (cm³/g) | Porosity (%) | Median Diameter D50 (μm) | Maximum $S_n$ | Volume (%) of Pores of 10 μm or Less |
| Example 1 | 0.840 | 67.9 | 17.0 | 1.7 | 13 |
| Example 2 | 0.560 | 58.5 | 7.5 | 1.8 | 50 |
| Example 3 | 0.731 | 64.8 | 8.6 | 2.0 | 67 |
| Example 4 | 0.498 | 55.7 | 5.8 | 1.8 | 65 |
| Example 5 | 1.460 | 78.6 | 19.2 | 1.7 | 22 |
| Example 6 | 0.810 | 67.1 | 14.0 | 1.7 | 37 |
| Example 7 | 0.640 | 61.7 | 16.0 | 2.2 | 18 |
| Example 8 | 0.677 | 63.0 | 6.0 | 1.7 | 67 |
| Example 9 | 1.180 | 74.8 | 24.0 | 1.6 | 8 |
| Example 10 | 0.599 | 60.2 | 5.5 | 1.6 | 72 |
| Example 11 | 0.570 | 59.0 | 9.0 | 1.8 | 64 |
| Example 12 | 1.230 | 75.6 | 18.5 | 2.0 | 28 |
| Example 13 | 0.756 | 65.6 | 14.5 | 2.1 | 32 |
| Example 14 | 0.562 | 58.6 | 5.2 | 1.7 | 68 |
| Example 15 | 1.350 | 77.3 | 18.2 | 1.9 | 27 |
| Example 16 | 0.885 | 69.0 | 20.0 | 1.7 | 23 |
| Example 17 | 0.485 | 55.0 | 5.1 | 1.6 | 70 |
| Example 18 | 0.486 | 55.1 | 8.8 | 1.6 | 54 |
| Example 19 | 0.654 | 62.2 | 15.5 | 2.3 | 34 |
| Example 20 | 0.594 | 60.0 | 9.8 | 1.8 | 53 |
| Example 21 | 0.910 | 69.6 | 19.0 | 1.8 | 18 |
| Example 22 | 0.630 | 61.4 | 15.4 | 1.7 | 32 |
| Example 23 | 0.860 | 68.4 | 11.0 | 1.6 | 43 |
| Example 24 | 1.485 | 78.9 | 19.8 | 1.7 | 25 |
| Example 25 | 0.490 | 55.3 | 12.9 | 1.6 | 36 |
| Comp. Ex. 1 | 1.650 | 80.6 | 32.0 | 1.2 | 17 |
| Comp. Ex. 2 | 0.390 | 49.6 | 3.8 | 0.8 | 96 |
| Comp. Ex. 3 | 0.655 | 62.3 | 23.0 | 0.7 | 14 |
| Comp. Ex. 4 | 0.640 | 61.7 | 16.0 | 0.5 | 32 |
| Comp. Ex. 5 | 1.701 | 81.1 | 30.0 | 1.1 | 20 |
| Comp. Ex. 6 | 0.255 | 39.1 | 8.0 | 0.3 | 56 |

(continued)

| No. | D50/d50 | Darcy's Coefficient of Permeability (×10⁻¹² m²) | CTE (20° C. to 800° C.) (×10⁻⁷/° C.) |
|---|---|---|---|
| Example 1 | 0.57 | 0.70 | 8.0 |
| Example 2 | 0.46 | 0.60 | 8.0 |
| Example 3 | 0.44 | 0.48 | 7.8 |
| Example 4 | 0.35 | 0.15 | 9.1 |
| Example 5 | 0.49 | 1.90 | 12.2 |
| Example 6 | 0.55 | 0.35 | 11.5 |
| Example 7 | 0.49 | 0.55 | 7.5 |
| Example 8 | 0.34 | 0.35 | 8.1 |
| Example 9 | 0.65 | 0.80 | 8.1 |
| Example 10 | 0.29 | 0.36 | 8.0 |
| Example 11 | 0.40 | 0.16 | 7.5 |
| Example 12 | 0.60 | 1.70 | 7.5 |
| Example 13 | 0.58 | 0.55 | 7.5 |
| Example 14 | 0.23 | 0.35 | 7.5 |
| Example 15 | 0.59 | 1.80 | 7.5 |
| Example 16 | 0.50 | 2.20 | 7.9 |
| Example 17 | 0.28 | 0.05 | 7.9 |
| Example 18 | 0.35 | 0.04 | 7.9 |
| Example 19 | 0.54 | 0.58 | 7.5 |
| Example 20 | 0.42 | 0.45 | 7.6 |
| Example 21 | 0.60 | 1.30 | 7.7 |
| Example 22 | 0.49 | 0.59 | 12.4 |
| Example 23 | 0.43 | 0.80 | 9.0 |
| Example 24 | 0.50 | 1.90 | 12.2 |
| Example 25 | 0.60 | 1.60 | 6.1 |
| Comp. Ex. 1 | 0.63 | 2.50 | 7.8 |
| Comp. Ex. 2 | 0.41 | 0.05 | 7.8 |
| Comp. Ex. 3 | 0.67 | 3.50 | 7.0 |
| Comp. Ex. 4 | 1.07 | 0.55 | 7.5 |
| Comp. Ex. 5 | 0.59 | 3.50 | 8.0 |
| Comp. Ex. 6 | 0.89 | 0.07 | 7.8 |

| | Evaluation Results | | | | |
|---|---|---|---|---|---|
| No. | Initial Pressure Loss (kPa) | | Soot-Capturing Pressure Loss *¹ (kPa) | | Capturing Efficiency (%) |
| Example 1 | 0.5 | Excellent | 1.0 | Excellent | 96.0 Good |
| Example 2 | 0.9 | Fair | 1.3 | Good | 98.2 Excellent |
| Example 3 | 0.7 | Good | 1.3 | Good | 98.0 Excellent |
| Example 4 | 1.0 | Fair | 1.4 | Fair | 95.3 Fair |
| Example 5 | 0.4 | Excellent | 0.9 | Excellent | 95.0 Fair |
| Example 6 | 0.8 | Good | 1.3 | Good | 95.4 Fair |
| Example 7 | 0.6 | Excellent | 0.9 | Excellent | 98.8 Excellent |
| Example 8 | 0.8 | Good | 1.4 | Fair | 98.3 Excellent |
| Example 9 | 0.7 | Good | 1.0 | Excellent | 95.9 Fair |
| Example 10 | 1.0 | Fair | 1.5 | Fair | 98.2 Excellent |
| Example 11 | 1.0 | Fair | 1.3 | Good | 99.3 Excellent |
| Example 12 | 0.5 | Excellent | 1.1 | Good | 95.2 Fair |
| Example 13 | 0.6 | Excellent | 1.1 | Good | 98.6 Excellent |
| Example 14 | 0.8 | Good | 1.3 | Good | 99.4 Excellent |
| Example 15 | 0.5 | Excellent | 1.0 | Excellent | 96.2 Good |
| Example 16 | 0.6 | Excellent | 1.0 | Excellent | 95.1 Fair |
| Example 17 | 1.0 | Fair | 1.5 | Fair | 98.8 Excellent |
| Example 18 | 1.0 | Fair | 1.5 | Fair | 99.3 Excellent |
| Example 19 | 0.6 | Excellent | 1.0 | Excellent | 98.6 Excellent |
| Example 20 | 0.7 | Good | 1.3 | Good | 99.4 Excellent |
| Example 21 | 0.6 | Excellent | 1.0 | Excellent | 96.1 Good |
| Example 22 | 0.6 | Excellent | 1.0 | Excellent | 98.6 Excellent |
| Example 23 | 0.7 | Good | 0.9 | Excellent | 97.4 Good |
| Example 24 | 0.4 | Excellent | 1.0 | Excellent | 95.6 Fair |
| Example 25 | 1.0 | Fair | 1.3 | Good | 95.4 Fair |
| Comp. Ex. 1 | 0.4 | Excellent | 1.2 | Good | 88.0 Poor |
| Comp. Ex. 2 | 1.5 | Poor | 1.9 | Poor | 96.5 Good |
| Comp. Ex. 3 | 0.4 | Excellent | 1.7 | Poor | 95.0 Fair |
| Comp. Ex. 4 | 1.5 | Poor | 1.9 | Poor | 93.0 Poor |
| Comp. Ex. 5 | 0.3 | Excellent | 1.1 | Good | 86.0 Poor |
| Comp. Ex. 6 | 1.6 | Poor | 2.0 | Poor | 97.0 Good |

Note:
*¹ Pressure loss when 2 g/liter of soot was captured.

It is clear from Table 7 that the ceramic honeycomb filters of Examples 1-25 within the scope of the present invention had improved PM-capturing ratios in terms of particle number in an initial capturing stage, while keeping low pressure loss. On the other hand, the ceramic honeycomb filter of Comparative Example 1 using the pore-forming material D having a median diameter of 85 μm (more than 70 μm) had large pore diameters and thus low capturing efficiency. The ceramic honeycomb filter of Comparative Example 2 using the pore-forming material E having a median diameter of 2.0 μm (less than 5 μm) had small pore diameters and thus poor pressure loss characteristics. The ceramic honeycomb filter of Comparative Example 3 using the pore-forming material H containing no inorganic powder had a small maximum inclination $S_n$ of a cumulative pore volume curve (namely, a wide pore distribution), and thus poor soot-capturing pressure loss characteristics. The ceramic honeycomb filter of Comparative Example 4 using the pore-forming material G made of graphite containing no inorganic powder had a small median diameter of pores and a small maximum inclination $S_n$ of a cumulative pore volume curve, and thus poor pressure loss characteristics and capturing efficiency. The ceramic honeycomb filter of Comparative Example 5 using too large an amount of a pore-forming material had large pore diameters, and thus low capturing efficiency. The ceramic honeycomb filter of Comparative Example 6 using too small an amount of (Note: Example 22 row in first table: 34.8 | 31.6 | 404; Example 23: 32.2 | 25.8 | 561; Example 24: 47.9 | 39.8 | 350; Example 25: 20.8 | 21.5 | 520; Comp. Ex. 1: 65.1 | 51.0 | 290; Comp. Ex. 2: 2.1 | 9.2 | 281; Comp. Ex. 3: 33.6 | 34.1 | 335; Comp. Ex. 4: 6.1 | 15.0 | 315; Comp. Ex. 5: 52.8 | 51.0 | 235; Comp. Ex. 6: 2.3 | 9.0 | 325 — continued from previous page.)

a pore-forming material had small pore diameters, and thus poor pressure loss characteristics.

EFFECT OF THE INVENTION

A filter comprising the ceramic honeycomb structure of the present invention can effectively capture nano-sized PM, which is dominant in the number of particles discharged in an initial use stage, even in an initial use stage before PM is accumulated (when the ceramic honeycomb filter is used from an unused state, or when it is reused after regeneration), providing an improved PM-capturing ratio in terms of the number of PM particles. Because its pressure loss characteristics are not deteriorated when PM is captured and accumulated, it can be used under further stricter exhaust gas regulations.

What is claimed is:

1. A method for producing a ceramic honeycomb structure, comprising the steps of extrusion-molding a moldable material containing a ceramic material and a pore-forming material to obtain a predetermined molding, and drying and sintering said molding; said moldable material containing 2-20% by mass of said pore-forming material based on 100% by mass of said ceramic material; said pore-foaming material having a median diameter of 5-70 μm; and said pore-forming material being hollow resin particles having inorganic powder on their outer surfaces, wherein said pore-forming material is produced by bringing said inorganic powder into contact with said resin particles wet with water.

2. The method for producing a ceramic honeycomb structure according to claim 1, wherein said inorganic powder is at least one selected from the group consisting of kaolin, silica, talc, cordierite, alumina, aluminum hydroxide, calcium carbonate and titanium oxide.

3. The method for producing a ceramic honeycomb structure according to claim 1, wherein said inorganic powder has a median diameter of 0.5-15 μm.

4. The method for producing a ceramic honeycomb structure according to claim 1, wherein said ceramic material is a cordierite-forming material, wherein said cordierite-forming material contains 15-25% of silica, and wherein said silica having a median diameter of 20-30 μm and sphericity of 0.5 or more.

5. The method for producing a ceramic honeycomb structure according to claim 4, wherein said cordierite-forming material contains talc having a median diameter of 1-10 μm.

6. A method for producing a ceramic honeycomb structure, comprising the steps of extrusion-molding a moldable material containing a ceramic material and a pore-forming material to obtain a predetermined molding, and drying and sintering said molding; said ceramic material being a cordierite-forming material; said cordierite-forming material containing 15-25% of silica; said silica having a median diameter of 20-28 μm and sphericity of 0.5 or more; said moldable material containing 2-20% by mass of said pore-forming material based on 100% by mass of said ceramic material; said pore-forming material having a median diameter of 5-70 μm; and said pore-forming material being solid or hollow resin particles having inorganic powder on their outer surfaces, wherein a ratio (d/D) of a median diameter (d) of said inorganic powder to the median diameter (D) of said resin particles is 0.01-0.5, and wherein said pore-forming material is produced by bringing said inorganic powder into contact with said resin particles wet with water.

7. The method for producing a ceramic honeycomb structure according to claim 1, wherein said moldable material contains 2-7.5% by mass of said pore-forming material based on 100% by mass of said ceramic material.

8. The method for producing a ceramic honeycomb structure according to claim 6, wherein said moldable material contains 2-7.5% by mass of said pore-forming material based on 100% by mass of said ceramic material.

9. A method for producing a ceramic honeycomb structure, comprising the steps of extrusion-molding a moldable material containing a ceramic material and a pore-forming material to obtain a predetermined molding, and drying and sintering said molding; said moldable material containing 2-20% by mass of said pore-forming material based on 100% by mass of said ceramic material; said pore-forming material having a median diameter of 5-70 μm; and said pore-forming material being solid resin particles having inorganic powder on their outer surfaces, wherein said pore-forming material is produced by bringing said inorganic powder into contact with said resin particles wet with water.

* * * * *